(12) United States Patent
Cowell et al.

(10) Patent No.: US 7,259,356 B2
(45) Date of Patent: Aug. 21, 2007

(54) TEMPERATURE SELF-REGULATING SOLDERING IRON WITH REMOVABLE TIP

(75) Inventors: Mark Cowell, San Carlos, CA (US); Kirk Li, San Francisco, CA (US); Mike Carlomagno, Chico, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/703,950

(22) Filed: Nov. 7, 2003

(65) Prior Publication Data

US 2005/0109756 A1  May 26, 2005

(51) Int. Cl.
*B23K 1/002* (2006.01)
*H05B 3/44* (2006.01)

(52) U.S. Cl. .................. 219/238; 219/229; 219/236; 219/616; 219/617; 361/719; 228/51

(58) Field of Classification Search ................ 219/229, 219/236, 238, 261, 616, 617, 241; 361/719; 228/33, 51
See application file for complete search history.

(56) References Cited

U.S. PATENT DOCUMENTS

| | | | |
|---|---|---|---|
| 3,851,145 A * | 11/1974 | Fukanaga | 219/236 |
| 3,919,524 A * | 11/1975 | Fortune | 219/238 |
| 4,745,264 A | 5/1988 | Carter | |
| 4,752,670 A | 6/1988 | Traub et al. | |
| 4,814,587 A * | 3/1989 | Carter | 219/552 |
| 4,839,501 A | 6/1989 | Cowell | |
| 4,877,944 A | 10/1989 | Cowell et al. | |
| 5,329,085 A | 7/1994 | Cowell et al. | |
| 5,379,941 A * | 1/1995 | Partel | 228/33 |
| 5,422,457 A | 6/1995 | Tang et al. | |
| 5,837,973 A * | 11/1998 | Tamura | 219/241 |
| 6,513,697 B1 | 2/2003 | Sines et al. | |
| 6,563,087 B1 | 5/2003 | Yokoyama et al. | |
| 6,793,114 B2 * | 9/2004 | Dunham et al. | 228/51 |
| 2002/0158106 A1 | 10/2002 | Yokoo | |
| 2003/0206401 A1* | 11/2003 | Zhou | 361/719 |

FOREIGN PATENT DOCUMENTS

GB    452937  *  9/1936
JP    2001252763  *  9/2001

* cited by examiner

*Primary Examiner*—Tu Ba Hoang
*Assistant Examiner*—Stephen Ralis
(74) *Attorney, Agent, or Firm*—Buchanan Ingersoll & Rooney PC

(57) ABSTRACT

A soldering iron with a removable tip, including: a soldering iron, including: a shaft; a ferrite bobbin disposed on the shaft; a magnetic coil wrapped around the ferrite bobbin; and a removable tip with a heater element disposed thereon, wherein the heater element is dimensioned to be received around the magnetic coil when the removable tip is placed onto the soldering iron.

17 Claims, 2 Drawing Sheets

TEMPERATURE SELF-REGULATING SOLDERING IRON WITH REMOVABLE TIP

TECHNICAL FIELD

The present invention relates to soldering irons.

BACKGROUND OF THE INVENTION

Metcal, Inc., of Menlo Park, Calif. has developed temperature self-regulating soldering iron systems in which an alloy heater element is disposed within a magnetic solenoidal coil. This structure is know as "solenoidal coupling". An advantage of this design is that it is very magnetically efficient. Examples of such solenoidal coupling systems are found in U.S. Pat. Nos. 4,745,264 and 4,839,501, both assigned to Metcal, Inc.

Unfortunately, although solenoidal coupling designs are very magnetically efficient, they are not as thermally efficient as could be desired. This is due to the comparatively small diameter (and thus small cross sectional area) of the heater element that is received within the surrounding magnetic solenoidal coil. Such small diameter heater elements have a comparatively high thermal resistance (i.e. low thermal efficiency) due to their small cross sectional area (through which the heat is axially conducted).

Such thermal inefficiencies are especially pronounced when the heater element of the soldering iron is temperature "self-regulating". This is due to the fact that such temperature self-regulating heater elements typically comprise an inner copper core (which conducts heat well, but which only conducts current therethrough when the copper reaches its Currie Temperature) and an outer alloy heating layer (in which the heat is generated). At low temperatures, current primarily passes through the outer alloy layer of the heater element. The inner copper core acts as the principal thermal conductor. Therefore, it is desirable to maintain a sufficiently large copper core thickness (and thus a sufficiently large cross-sectional area) to maintain a sufficiently high overall thermal efficiency for the heater element. A large diameter copper core unfortunately results in the tip of the soldering iron having a large base diameter. It would instead be desirable to keep the diameter of the base of the tip small (to facilitate viewing during soldering operations).

To compensate for the low thermal efficiencies of such solenoidal coupling designs, a high frequency power supply is therefore typically required. This is due to the fact that the amount of power generated by the heater element is a function of the surface area of the alloy heating layer times the watt density passing therethrough. Since the heating layer has a comparatively small diameter (to fit within the surrounding magnetic coil) the heating layer will also have a comparatively small surface area. A small surface area alloy heating layer will therefore require a higher watt density heater. Consequently, a higher operating frequency power supply will be required to generate this required increased watt density. Unfortunately, such high frequency power supplies tend to be expensive.

As stated above, the thermal inefficiencies of solenoidal coupling designs become especially pronounced as the diameter of the base of the tip of the soldering iron is designed to be made smaller and smaller. In view of the above discussed limitations, it is therefore difficult to design a thermally efficient small diameter tip soldering iron in which the magnetic coil wraps around the heater element. This is especially true in the case of temperature self-regulating heater assemblies. In addition, an outer sleeve of ferromagnetic material is required as a shield to minimize coupling in low resistance materials and to prevent radiated emissions.

An alternate design is to instead have the heater element disposed around the magnetic coil. An example of this system can be seen in U.S. Pat. No. 4,877,944, also assigned to Metcal, Inc. An advantage of this design is that it is comparatively more thermally efficient. This is due to the comparatively larger cross sectional area of the heater element (as compared to the above described solenoidal coupling designs). As such, an advantage of this design is that it can be made small enough to fit into a small diameter tip soldering iron. Moreover, when using a temperature self-regulating heater element in this design, the copper layer is instead disposed around the alloy heater (i.e. the opposite of the above described solenoidal coupling designs). Accordingly, the outer copper layer has a larger cross sectional area (as compared to the smaller copper core found in the above described solenoidal coupling designs). Such a larger cross sectional area of the copper layer increases the overall thermal efficiency of the device.

Unfortunately, this design is comparatively less magnetically efficient. This is due to the fact that the magnetic field density is lower on the outside of the magnetic coil (i.e. where the heater element is disposed) than on the inside of the magnetic coil (i.e. where the heater element is disposed on the above described solenoidal coupling design). Accordingly, a higher frequency power supply is typically required to achieve the desired watt densities.

Another problem with soldering irons in general is that their tips are prone to wear out over time, requiring replacement. An example of a replaceable tip system is found in the solenoidal coupling design found in U.S. Pat. No. 5,329,085, also assigned to Metcal, Inc. In this system, the magnetic coil is wrapped around the heater element, and both the heater element and the magnetic coil are part of the cartridge or shaft into which the replaceable tip is received.

An advantage of the '085 system is that it uses a low frequency (i.e. low cost) power supply. Unfortunately, however, the diameter of the heater element is made relatively large to accommodate a thick large cross sectional area copper core so that such a low frequency power supply can be used. In addition, an outer sleeve of ferromagnetic material is required as a shield to minimize coupling in low resistance materials and to prevent radiated emissions.

In view of the forgoing limitations found in the prior art, what is instead desired is a temperature self-regulating soldering iron having a replaceable tip with a small base diameter that can be operated with a low frequency power supply.

SUMMARY OF THE INVENTION

The present invention provides a soldering iron with a removable tip, comprising: a soldering iron, including: a shaft, a ferrite bobbin disposed on the shaft; and a magnetic coil wrapped around the ferrite bobbin; and, a removable tip with a heater element disposed thereon, wherein the heater element is dimensioned to be received around the magnetic coil when the removable tip is placed onto the soldering iron.

In preferred aspects, the heater element comprises an inner heating alloy layer; and an outer conductive layer. In preferred aspects, the outer conductive layer is made of copper, but the present invention is not so limited. For example, any suitable thermally and electrically conductive material may be used.

Optionally, the invention may further include a first sleeve extending from the shaft over the ferrite bobbin and the magnetic coil, and a second sleeve extending from the removable tip over the heater element. Preferably, the sleeve on the removable tip is dimensioned to be received over the sleeve on the shaft. In optional embodiments, the sleeve extending from the removable tip may be made of stainless steel.

In optional embodiments, the present invention may include a power source connected to its magnetic coil. In accordance with the invention, such power source may be operated at a frequency of less than 500 KHz. However, the present invention is not so limited as higher frequency power supplies may be used. This is especially true if the costs of higher frequency power supplies continue to decline in the future.

In another aspect, the present invention provides a removable tip for a soldering iron, including: a body; and a heater element extending from the body, wherein the heater element is dimensioned such that it can be received over a magnetic coil that is wrapped around a ferrite bobbin on a shaft of a soldering iron when the removable tip is placed onto the soldering iron.

In another aspect, the present invention provides a soldering iron assembly configured to receive a removable tip thereon, including: a shaft; a ferrite bobbin disposed on the shaft; and a magnetic coil wrapped around the ferrite bobbin, wherein the ferrite bobbin and the magnetic coil are dimensioned to be received within a heater element disposed on a removable tip when the removable tip is placed onto the soldering iron.

Thus, the present invention provides a soldering iron system in which the tip of the soldering iron is easily removable (and replaceable), wherein the magnetic coil is disposed on the shaft of the soldering iron, wherein the heater element is disposed on the removable tip itself, and wherein the magnetic coil (on the shaft of the soldering iron) is received within the heater element (on the replaceable tip).

The present invention has numerous advantages, including, but not limited to the following.

First, its tip is easily removable and quickly replaceable.

Second, by having its thermally conducting copper layer disposed around its inner heater alloy layer (which is in turn disposed around its magnetic coil), the present invention provides a large cross sectional area of thermally conductive material. This makes the present invention thermally efficient, thereby permitting the use of a lower frequency (i.e. less expensive) generator.

Third, existing systems typically have their heater disposed in the body of the soldering iron itself. A problem with this common design is that there is thermal resistance between the heater and the tip of the soldering iron. In contrast, the present invention provides a heater element that is positioned on the removable tip itself. Thus, the problem of thermal resistance between the tip and the heater element is avoided, or substantially reduced. Accordingly, the present invention results in a more consistent soldering performance, and better heat delivery to the tip.

Fourth, by having such a lower thermal resistance between the heater element and the tip itself, it may be possible to operate the present heating system at a lower temperature than that of existing systems, thereby extending the life of the heater element. In conventional systems, the heater is disposed on the soldering iron body (not the tip). Thus, such conventional systems require operation of their heaters at higher temperatures to ensure sufficient heat transfer from the heater to the tip of the soldering iron. This is especially true in the case of cartridge heaters which typically incorporate various electrically insulating materials therein.

Fifth, a surprising advantage of the present invention is that the repeatability of its induction coupling is improved at lower frequencies. Therefore, with the present system, different replaceable tips all tend to operate at near the same power output at low frequencies. Moreover, by providing such increased magnetic coupling at low frequencies, it is possible to tolerate a more slightly increased distance between the magnetic coil and the heater element. Thus, the sleeve-in-sleeve design of the present invention is easier to build to acceptable mechanical tolerances. In other words, a larger permissible gap between the magnetic coil and the heater element results in a less tight fitting sleeve-in-sleeve design.

Sixth, by having its magnetic coil disposed on the shaft of the soldering iron, the present invention avoids the need to replace the magnetic coil when the tip is replaced.

Seventh, by placing its heater element around its magnetic coil, the outer copper layer and the alloy heating layer of the present heater element acts as magnetic shielding.

Eight, the present invention's optional sleeve-in-sleeve design provides double physical protection for its magnetic coil. In addition, the sleeve-in-sleeve design provides an easy way to remove/attach the tip to the magnetic coil assembly.

Lastly, the optional sleeve-in-sleeve design improves the reliability of the tip to ground connection, which is an important consideration with soldering irons. With pre-existing designs, the major source of electrical resistance is oxidation occurring between the tip and a sleeve (or other retention device). In contrast, the present invention advantageously moves the electrical connection point from being the "tip to sleeve" point (seen in pre-existing designs) to the "sleeve to shaft" connection point, thus reducing the connection temperature and rate of oxide formation.

DETAILED DESCRIPTION OF THE DRAWINGS

Figure 1:
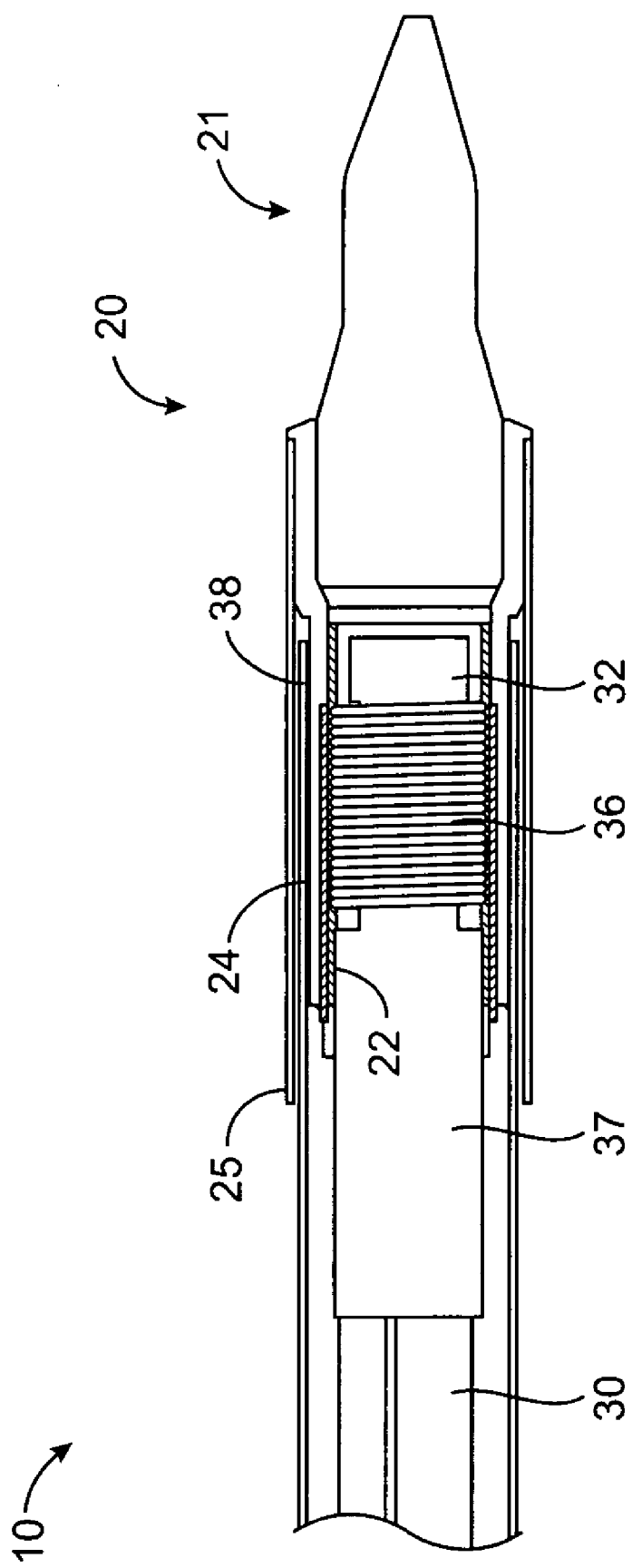
FIG. 1 is an assembled sectional side elevation view of the soldering iron and removable tip of the present invention.
Figure 2:
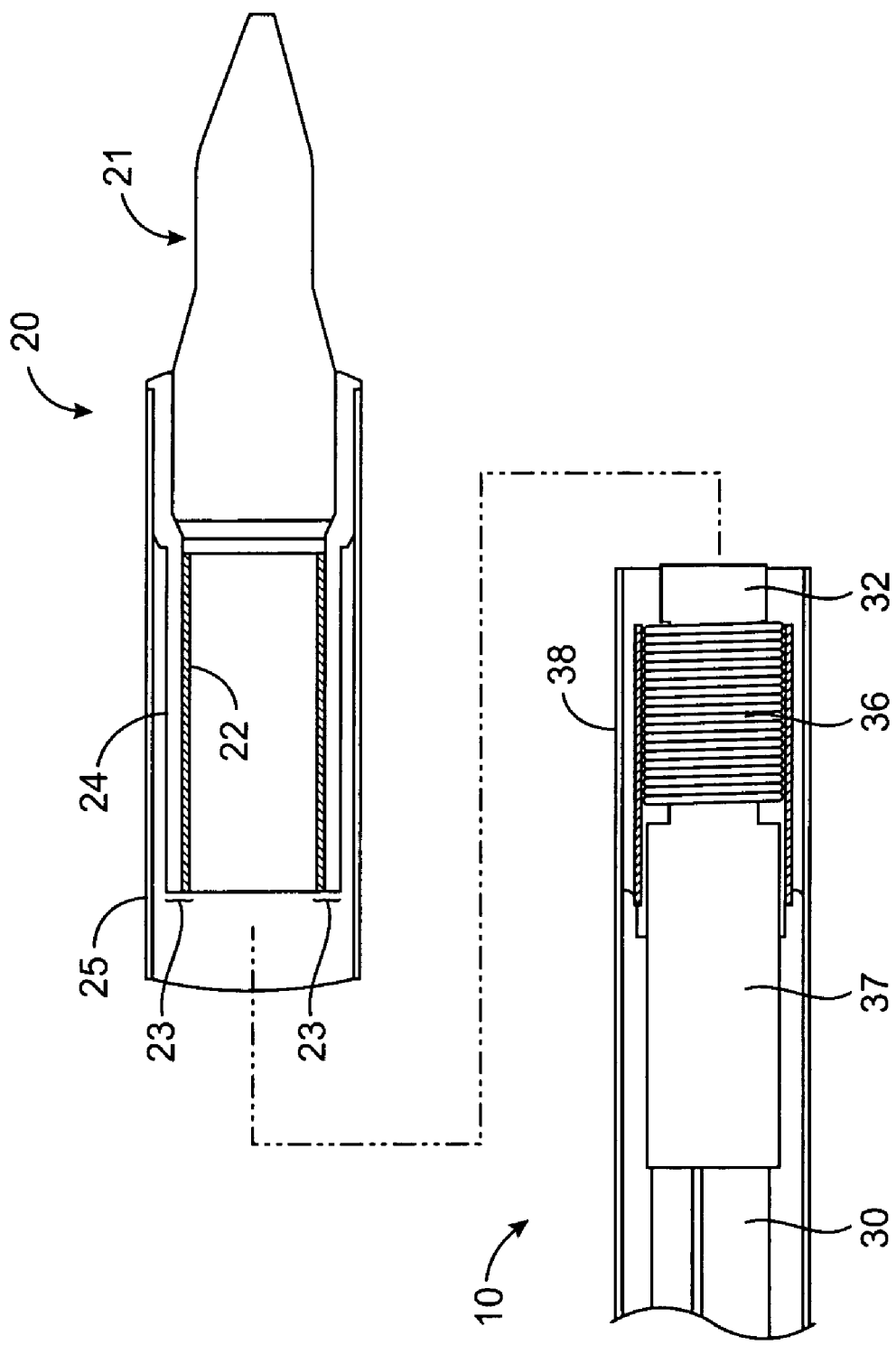
FIG. 2 is an exploded view corresponding to FIG. 1.

FIG. 1 is an assembled view of the present soldering iron shaft with a removable tip placed thereon. FIG. 2 is an exploded view with the tip removed.

The present invention provides a soldering iron 10 having a removable tip 20. Soldering iron 10 includes a shaft 30 with a ferrite bobbin 32 mounted thereon. A magnetic coil 36 is wrapped around ferrite bobbin 32.

A removable tip 20 is also provided. Removable tip 20 includes a main body 21 with a heater element 23 extending therefrom. Most preferably, heater element 23 includes a cylindrical inner alloy heating layer 22 surrounded by a cylindrical outer copper layer 24. Heater element 23 is dimensioned such that inner alloy heating layer 22 is received around magnetic coil 36 when removable tip 20 is placed onto soldering iron 10.

Ferrite bobbin 32 significantly improves magnetic coupling by improving the reluctance of the magnetic circuit formed between heating layer 22 and magnetic coil 36. Ferrite bobbin 32 has a Curie Temperature higher than the Curie Temperature of heating layer 22. Such higher Curie Temperature of ferrite bobbin 32 insures that bobbin 32 remains ferromagnetic when at the soldering iron or heating element's operating temperature.

Since ferrite bobbin 32 is typically made of a thermally non-conductive material, an optional heat spreader 37 may optionally be provided adjacent to ferrite bobbin 32. Heat spreader 37 wicks away heat from bobbin 32 thereby reducing the temperature of bobbin 32, so as to maintain its temperature below its Currie temp.

In various embodiments, shaft 30 may be a shaft extending from a one piece, or multiple piece, soldering iron handle. In various preferred embodiments, shaft 30 may be made from stainless steel, but is not so limited.

In preferred embodiments, shaft 30 may include a cylindrical sleeve 38 that extends over (and thus protects) ferrite bobbin 32 and magnetic coil 36. Sleeve 38 may be made from stainless steel, but is not so limited. Optionally, sleeve 38 may simply be part of shaft 30.

The main body 21 of tip 20 is preferably made from copper, or any other suitable thermal conductor. Preferably, at least the distal end of main body 21 is iron plated. Such iron plating protects the copper core of tip 20 from dissolving in the solder during use. Iron plating a copper core soldering iron tip is common in the art.

Heater element 23 of tip 20 includes a cylindrical inner alloy heating layer 22 and a cylindrical outer copper (or other suitable conductive material) layer 24.

In various embodiments, heating layer 22 may be made from iron-nickel alloys, but is not so limited. Specifically, it is to be understood that other materials are suitable as well, without limiting the scope of the invention. For example, heating layer 22 may also be made from iron-cobalt alloys.

In various embodiments, outer layer 24 need not be made of copper. For example, outer layer 24 may also be made from other suitable thermally conductive materials, including, but not limited to aluminum and copper alloys.

In preferred embodiments, tip 20 further includes a sleeve 25. As can be seen, sleeve 25 is dimensioned such that it extends over sleeve 38 and over a portion of shaft 30 when tip 20 is received onto the distal end of soldering iron assembly 10, as shown in the assembled view of FIG. 1.

In preferred embodiments, sleeve 25 is made of a suitable electrically conductive (but thermally non-conductive) material, such as stainless steel. An advantage of having sleeve 25 be electrically conductive is that it provides a ground path for the soldering iron. Although stainless steel may be used for sleeve 25, the present invention is not so limited. For example, newer high temperature plastics, including, but not limited to, Liquid Crystal Polymers may instead be used. If such plastics are used, they are preferably nickel plated so that they are electrically conductive. In various preferred embodiments, sleeve 25 may either be made of various ferromagnetic or non-ferromagnetic materials.

In optional embodiments, the diameter of either or both of shaft 30, or base of tip 20 range in size from about 0.150 to 0.375 inches. In preferred embodiments, the diameter the base of tip 20 is the same as the diameter of shaft 30. Preferably, the diameter of the base of tip 20 is less than 0.25 inches.

As illustrated schematically in FIG. 1, a power source 50 is connected to power magnetic coil 36. As explained above, the use of ferrite bobbin 32 improves the magnetic efficiency of the soldering iron, thus reducing the need for such a high frequency power supply. Thus, a lower frequency power supply can be used with this design. As a result, in preferred embodiments, power source 50 may optionally be operated at a frequency of less than 500 KHz. An advantage of using lower frequency power supplies are that they are less expensive.

As seen in FIGS. 1 and 2, sleeve 38 is preferably received within sleeve 25 when tip 20 is placed onto soldering iron 10. Together, sleeves 38 and 25 provide physical protection for magnetic coil 36 and ferrite bobbin 32. Additionally, outer copper layer 24 and sleeve 25 together act as magnetic shielding for magnetic coil 36.

A further advantage of the present removable tip design is that coupling between heater layer 22 and magnetic coil 36 is better at lower frequencies. Therefore, the small physical air gap between alloy heating layer 22 and magnetic coil 36 can be made large enough such that the present invention can be built within acceptable tolerances. Specifically, the fit between tip 20 and soldering iron 10 can be made just loose enough such that tip 20 can be removed from soldering iron 10 without sticking. Moreover, power source 50 may be low frequency (i.e. inexpensive) power source.

What is claimed is:

1. A soldering iron with a removable tip, comprising:
   (a) a soldering iron, comprising:
      a shaft;
      a ferrite bobbin disposed on the shaft;
      a magnetic induction coil wrapped around the ferrite bobbin; and
      a first sleeve spaced from the coil to define an opening between said sleeve and said coil; and
   (b) a removable tip assembly, comprising:
      a removable tip body;
      a tubular induction heater element extending from the removable tip body; and
      a second sleeve extending from the removable tip body and configured to engage the first sleeve of the soldering iron, said second sleeve spaced outwardly from the tubular induction heater element to form a space between the tubular induction heater element and the second sleeve, said space configured to receive said first sleeve of said soldering iron, wherein the tubular induction heater element is configured to be received around the outside of the magnetic induction coil and within the opening, cooperation of said first and second sleeve preventing said heater element from damaging said bobbin as said tip assembly is positioned onto said soldering iron, wherein the magnetic induction coil generates a magnetic field, and wherein the magnetic field generates heat in the tubular induction heater.

2. The soldering iron with a removable tip as set forth in claim 1, wherein the tubular induction heater element comprises:
   an inner heating alloy layer; and
   an outer copper layer.

3. The soldering iron with a removable tip as set forth in claim 1, wherein the first sleeve extends beyond the ferrite bobbin and the magnetic induction coil.

4. The soldering iron with a removable tip as set forth in claim 1, wherein the second sleeve extends beyond the tubular induction heater element.

5. The soldering iron with a removable tip as set forth in claim 4, wherein the sleeve is made of stainless steel.

6. The soldering iron with a removable tip as set forth in claim 1, wherein the first sleeve extends beyond the ferrite bobbin and the magnetic induction coil; and wherein the second sleeve extends beyond the tubular induction heater element, wherein the second sleeve on the removable tip is configured to extend over the first sleeve and over at least a portion of the shaft.

7. The soldering iron with a removable tip as set forth in claim 1, further comprising:
   a copper heat spreader disposed adjacent to the ferrite bobbin to maintain the temperature of the ferrite bobbin below it Curie temp.

8. The soldering iron with a removable tip as set forth in claim 1, wherein the diameter of the base of the tip is less than 0.25 inches in diameter.

9. The soldering iron with a removable tip as set forth in claim 1, further comprising:
   a power source connected to the magnetic induction coil.

10. The soldering iron of claim 9, wherein the power source is operated at a frequency of less than 500 KHz.

11. A removable tip assembly for use with a soldering iron having a magnetic induction coil that is wrapped around a ferrite bobbin on a shaft of the soldering iron and a soldering iron sleeve extending from the shaft of the soldering iron and spaced apart from the coil to form an opening between said sleeve and said coil, the removable tip assembly comprising:
   a removable tip body;
   a tubular induction heater element extending from the removable tip body; and
   a first sleeve extending from the removable tip body and configured to engage the soldering iron, said first sleeve being spaced outwardly from the tubular induction heater element to form a space between the tubular induction heater element and said first sleeve, the tubular induction heater element being configured to be received within the opening and around the outside of the magnetic induction coil, cooperation of said first sleeve and said soldering iron sleeve preventing said heater element from damaging said bobbin as said tip assembly is positioned onto said soldering iron, wherein the magnetic induction coil generates a magnetic field, and wherein the magnetic field generates heat in the tubular induction heater.

12. The removable tip of claim 11, wherein the tubular induction heater element comprises:
   an inner heating alloy layer; and
   an outer copper layer.

13. The removable tip of claim 11, wherein the first sleeve is configured to extend beyond the tubular induction heater element.

14. The removable tip of claim 13, wherein the first sleeve is made of stainless steel.

15. A soldering iron assembly configured to receive a removable tip assembly having a tubular induction heater element extending from a tip body and a removable tip sleeve extending from said tip body and spaced apart from said tubular induction heater element to form a space between said sleeve and said tubular induction heater element, the soldering iron assembly comprising:
   a shaft;
   a ferrite bobbin disposed on the shaft;
   a magnetic induction coil wrapped around the ferrite bobbin; and
   a first sleeve extending from the shaft and spaced apart from the coil to form an opening between said first sleeve and said coil, wherein the ferrite bobbin and the magnetic induction coil are configured to be received within the tubular induction heater element, cooperation of said first sleeve and said removable tip sleeve preventing said heater element from damaging said bobbin as said tip is positioned onto said soldering iron, wherein the magnetic induction coil generates a magnetic field, and wherein the magnetic field generates heat in the tubular induction heater.

16. The soldering iron of claim 15, wherein the first sleeve extends from the iron assembly and beyond the ferrite bobbin and the magnetic coil.

17. The soldering iron of claim 15, further comprising:
   a copper heat spreader disposed adjacent to the ferrite bobbin to maintain the temperature of the ferrite bobbin below its Curie temp.

* * * * *